(12) United States Patent
Moser et al.

(10) Patent No.: US 11,040,576 B2
(45) Date of Patent: Jun. 22, 2021

(54) TIRE WITH GROOVES HAVING VARIABLE DEPTH

(71) Applicant: Bridgestone Americas Tire Operations, LLC, Nashville, TN (US)

(72) Inventors: Russ A. Moser, Akron, OH (US); Richard S. Parr, Uniontown, OH (US)

(73) Assignee: Bridgestone Americas Tire Operations, LLC, Nashville, TN (US)

( * ) Notice: Subject to any disclaimer, the term of this patent is extended or adjusted under 35 U.S.C. 154(b) by 77 days.

(21) Appl. No.: 16/282,356

(22) Filed: Feb. 22, 2019

(65) Prior Publication Data

US 2019/0184761 A1 Jun. 20, 2019

Related U.S. Application Data

(62) Division of application No. 15/107,803, filed as application No. PCT/US2014/070704 on Dec. 17, 2014, now Pat. No. 10,259,268.

(Continued)

(51) Int. Cl.
*B60C 11/12* (2006.01)
*B60C 11/03* (2006.01)
*B60C 11/11* (2006.01)

(52) U.S. Cl.
CPC ...... *B60C 11/1263* (2013.01); *B60C 11/0306* (2013.01); *B60C 11/11* (2013.01);
(Continued)

(58) Field of Classification Search
CPC .............. B60C 11/03; B60C 11/0306; B60C 2011/0346; B60C 2011/0348;
(Continued)

(56) References Cited

U.S. PATENT DOCUMENTS 3,012,599 A 12/1961 Benson et al.
3,402,751 A * 9/1968 Jacobs ................ B60C 11/0306
152/209.18

(Continued)

FOREIGN PATENT DOCUMENTS

EP 0705721 A2 4/1996
EP 0705721 A3 12/1996
(Continued)

OTHER PUBLICATIONS

Gent, Alan Neville and Walter, Joseph D., "Pneumatic Tire". (Year: 2006).*

(Continued)

*Primary Examiner* — Eric Hug
(74) *Attorney, Agent, or Firm* — Shaun J. Fox; Bryan J. Jaketic (57) ABSTRACT

A tire includes a tread and a narrow, wavy, circumferential groove disposed on the tread, which extend around the tread in a circumferential direction. The narrow, wavy, circumferential groove has a first axial position associated with a minimum axial displacement, a second axial position associated with a maximum axial displacement, and the narrow, wavy, circumferential groove follows a serpentine path between the first and second axial positions. The narrow, wavy, circumferential groove has a first depth and a second depth, the first depth being a minimum narrow, wavy, circumferential groove depth and the second depth being a maximum narrow, wavy, circumferential groove depth. The narrow, wavy, circumferential groove follows a serpentine path between the first and second depths. The first depth of the narrow, wavy, circumferential groove and the second depth of the narrow, wavy, circumferential groove is between 0.10 mm and full tread depth.

6 Claims, 6 Drawing Sheets

Related U.S. Application Data (60) Provisional application No. 61/920,539, filed on Dec. 24, 2013.

(52) U.S. Cl.
CPC ...... B60C 11/1218 (2013.01); B60C 11/1236 (2013.01); B60C 11/1281 (2013.01); B60C 2011/0346 (2013.01); B60C 2011/0355 (2013.01); B60C 2011/1213 (2013.01); B60C 2011/1245 (2013.01)

(58) Field of Classification Search
CPC ............. B60C 2011/0355; B60C 11/11; B60C 11/1263; B60C 11/1218; B60C 11/1281; B60C 11/1236; B60C 11/1245; B60C 2011/1213
USPC ....................................................... 152/209.1
See application file for complete search history.

(56) References Cited

U.S. PATENT DOCUMENTS

| | | | | |
|---|---|---|---|---|
| 5,078,190 | A * | 1/1992 | Wissbrock | B60C 11/0318 152/902 |
| 5,198,047 | A | 3/1993 | Graas | |
| 5,343,918 | A | 9/1994 | Fontaine | |
| 5,647,926 | A | 7/1997 | Van Der Meer | |
| 7,093,631 | B2 | 8/2006 | Colombo et al. | |
| 2010/0224297 | A1* | 9/2010 | Kiwaki | B60C 11/1218 152/209.23 |
| 2012/0222790 | A1 | 9/2012 | Copeland et al. | |
| 2014/0224394 | A1* | 8/2014 | Ochi | B60C 11/0304 152/209.18 |
| 2015/0251500 | A1* | 9/2015 | Pokutta-Paskaleva | B60C 11/1236 152/209.25 |
| 2016/0243890 | A1* | 8/2016 | Nishida | B60B 1/14 |
| 2016/0243898 | A1* | 8/2016 | Ito | B60C 11/0327 |

FOREIGN PATENT DOCUMENTS

| | | | | |
|---|---|---|---|---|
| EP | 1531064 | | 5/2005 | |
| EP | 1961586 | | 8/2008 | |
| JP | 2008-183989 | * | 8/2008 | ............. B60C 11/12 |
| JP | 2012-153157 | * | 8/2012 | ......... B60C 11/0306 |
| WO | 9721556 | | 6/1997 | |

OTHER PUBLICATIONS

JP 2012-153157, English language machine translation [www.epo.org], (Year: 2012).*

International Search Report and Written Opinion of the International Searching Authority; corresponding PCT Application No. PCT/US2014/070704; Authorized Officer Lee, Chang Ho; dated Mar. 20, 2015.

International Preliminary Report on Patentability; corresponding PCT Application No. PCT/US2014/070704; Authorized Officer Simin Baharlou; dated Jun. 28, 2016.

Supplemental European Search Report and Opinion; corresponding EP Application No. 14874792; dated Jul. 10, 2017.

* cited by examiner

TIRE WITH GROOVES HAVING VARIABLE DEPTH

CROSS-REFERENCE TO RELATED APPLICATIONS

The present application is a divisional of U.S. patent application Ser. No. 15/107,803 filed Jun. 23, 2016 and presently pending, which is a national stage entry of PCT/US2014/070704 filed Dec. 17, 2014, which claims priority from U.S. Provisional Patent Application No. 61/920,539 filed Dec. 24, 2013. The entire contents of these disclosures are hereby expressly incorporated by reference in their entirety.

FIELD OF INVENTION

The present disclosure is directed to a vehicle tire tread. More particularly the present disclosure is directed to a vehicle tire that has wavy, serpentine, curvilinear, or spline features in an outer component, such as a tire tread. The tire may be pneumatic or non-pneumatic.

BACKGROUND

Known tire treads have a variety of grooves and sipes. The grooves and sipes may vary in width, length, depth, and planar orientation. Modifying the width, length, depth, and planar orientation of these features will impact various properties of the tire, such as stiffness and wear. Thus, the width, length, depth, and planar orientation of these features is modified to improve tire performance.

SUMMARY OF THE INVENTION

In one embodiment, a tire includes a circumferential tread and at least two primarily straight circumferential grooves disposed in the circumferential tread, which extend continuously around the tire in a circumferential direction. The at least two primarily straight circumferential grooves define at least three circumferential ribs, which extend around the tire in the circumferential direction. The at least three circumferential ribs include two outer circumferential ribs, each of which is disposed between an outer edge of the circumferential tread and an axially-outer edge of a circumferential groove. The at least three circumferential ribs further include at least one inner circumferential rib disposed between axially-inner edges of at least two circumferential grooves. The tire further includes a first plurality of predominately-axial grooves, disposed in at least one outer circumferential rib, which extend from an outer edge of the circumferential tread to a circumferential groove. The tire also includes a second plurality of predominately-axial grooves, disposed on at least one inner circumferential rib, which extend across at least a portion of an inner circumferential rib. The tire further includes a first plurality of predominately-axial sipes, disposed on at least one outer circumferential rib, which extend across at least a portion of the at least one outer circumferential rib between an outer edge of the circumferential tread and a circumferential groove. The tire also includes a second plurality of predominately-axial sipes, disposed on at least one inner circumferential rib, which extend across at least a portion of an inner circumferential rib. The tire further includes at least two narrow, wavy, circumferential grooves, disposed on at least two outer circumferential ribs, which extend around the circumferential tread in the circumferential direction. The tire also has at least one wavy, circumferential sipe, disposed on at least one inner circumferential rib, which extends around the circumferential tread in the circumferential direction. The tire further has a plurality of shoulder grooves disposed along an outer edge of the circumferential tread between the wavy, circumferential sipes and a sidewall, which extend predominately circumferentially. The tire also includes a plurality of tie-bars, disposed in the first plurality of predominately-axial grooves. The at least two narrow, wavy, circumferential grooves disposed on the outer circumferential ribs undulate axially between an outer edge of the circumferential tread and an outer edge of a circumferential groove. The wavy, circumferential sipe disposed on an inner circumferential rib undulates axially between the inner edges of adjacent circumferential grooves. The depth of the narrow, wavy, circumferential grooves disposed on the outer circumferential ribs varies in a curvilinear manner, such that the depth of the narrow, wavy, circumferential grooves increases as the circumferential distance from the narrow, wavy, circumferential groove to a predominately-axial sipe increases. The width of each of the two narrow, wavy, circumferential grooves disposed on the outer circumferential ribs is greater than the width of the wavy, circumferential sipe disposed on an inner circumferential rib.

In another embodiment, a tire includes a tread and a narrow, wavy, circumferential groove disposed on the tread, which extend around the tread in a circumferential direction. The narrow, wavy, circumferential groove has a first axial position associated with a minimum axial displacement, a second axial position associated with a maximum axial displacement, and the narrow, wavy, circumferential groove follows a serpentine path between the first and second axial positions. The narrow, wavy, circumferential groove has a first depth and a second depth, the first depth being a minimum narrow, wavy, circumferential groove depth and the second depth being a maximum narrow, wavy, circumferential groove depth. The narrow, wavy, circumferential groove follows a serpentine path between the first and second depths. The first depth of the narrow, wavy, circumferential groove and the second depth of the narrow, wavy, circumferential groove is between 0.10 mm and full tread depth.

In yet another embodiment, a tire includes a first annular bead, a second annular bead, and a body ply extending between the first annular bead and the second annular bead. The tire also includes a circumferential belt disposed radially outward of the body ply and extending axially across a portion of the body ply. The tire further includes a circumferential tread disposed radially outward of the circumferential belt and extending axially across a portion of the body ply. The tire also has a first sidewall extending between the first annular bead and a first shoulder, the first shoulder being associated with the circumferential tread. The tire further has a second sidewall extending between the second annular bead and a second shoulder, the second shoulder being associated with the circumferential tread. The circumferential tread further comprises at least three circumferential grooves that divide the circumferential tread into two outer circumferential ribs and two inner circumferential ribs, and a narrow, wavy, circumferential groove. The narrow, wavy, circumferential groove has multiple inflection points, and the narrow, wavy, circumferential groove is disposed on an outer circumferential rib.

BRIEF DESCRIPTION OF THE DRAWINGS

In the accompanying drawings, structures are illustrated that, together with the detailed description provided below, describe exemplary embodiments of the claimed invention. Like elements are identified with the same reference numerals. It should be understood that elements shown as a single component may be replaced with multiple components, and elements shown as multiple components may be replaced with a single component. The drawings are not to scale and the proportion of certain elements may be exaggerated for the purpose of illustration.

DETAILED DESCRIPTION

The following includes definitions of selected terms employed herein. The definitions include various examples and/or forms of components that fall within the scope of a term and that may be used for implementation. The examples are not intended to be limiting. Both singular and plural forms of terms may be within the definitions.

"Axial" and "axially" refer to a direction that is parallel to the axis of rotation of a tire.

"Circumferential" and "circumferentially" refer to a direction extending along the perimeter of the surface of the tread perpendicular to the axial direction.

"Radial" and "radially" refer to a direction perpendicular to the axis of rotation of a tire.

"Sidewall" as used herein, refers to that portion of the tire between the tread and the bead.

"Tread" as used herein, refers to that portion of the tire that comes into contact with the road or ground under normal inflation and load.

While similar terms used in the following descriptions describe common tire components, it is understood that because the terms carry slightly different connotations, one of ordinary skill in the art would not consider any one of the following terms to be purely interchangeable with another term used to describe a common tire component.

Figure 1:
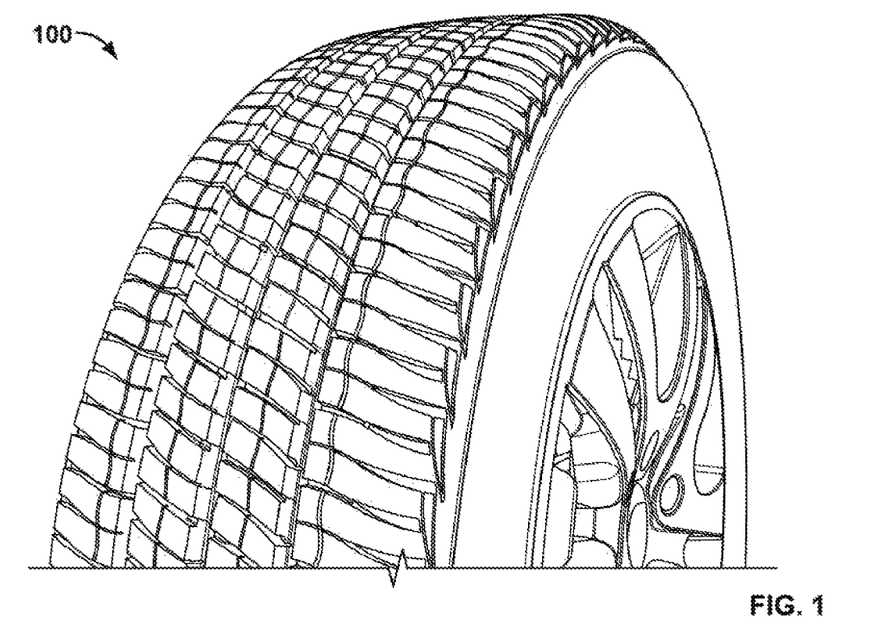
FIG. 1 is a perspective view of one embodiment of a new tire.
Figure 2:
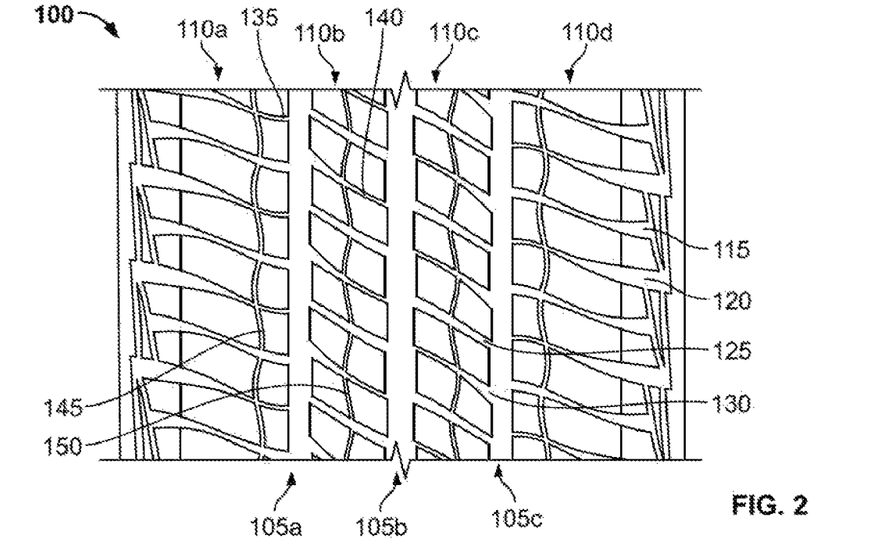
FIG. 2 is a top plan view of the tire shown in FIG. 1.

FIG. 1 is a perspective view of one embodiment of a tire 100. In FIG. 1, tire 100 is new. It is understood that the tread pattern on tire 100 is repeated about the circumference of the tire tread, and the opposite side is the same as that shown. FIG. 2 is an enlarged fragmentary front elevational view of tire 100. Tire 100 will be described with reference to both FIGS. 1 and 2.

A circumferential tread extends around the tire 100. Although only a portion of the circumferential tread can be seen in the figures, one of ordinary skill in the art will understand the tread pattern is repeated throughout the circumference of tire 100, and the opposite side of tire 100 (not shown) is the same as the portion that is shown. As one of ordinary skill in the art will understand, tire 100 is suitable for use in various types of vehicles, and is particularly suitable for passenger vehicles and/or light trucks.

Circumferential grooves 105a-c divide the circumferential tread of the tire 100 into circumferential ribs 110a-d. Both the ribs and grooves extend continuously around the tire in a circumferential direction. Ribs 110a and 110d are outer circumferential ribs, and ribs 110b and 110c are inner circumferential ribs. The outer circumferential ribs 110a and 110d are disposed between an outer edge of the tire tread and the axially-outer edges of circumferential grooves 105a and 105c. The inner circumferential ribs 110b and 110c are disposed between the axially-inner edges of circumferential grooves 105a and 105c. While four circumferential ribs are shown in the illustrated embodiment, it should be understood that any number of ribs may be employed. Additionally, while the circumferential grooves are shown as being substantially straight in the illustrated embodiment, it should be understood that they may follow any pattern.

Ribs 110a and 110d contain a first plurality of predominately-axial grooves 115. The grooves are predominately-axial because the axial displacement of the grooves is greater than the circumferential displacement of the grooves. In alternative embodiments, the first plurality of predominately-axial grooves may be replaced with transverse grooves disposed at any angle. In another alternative embodiment, the first plurality of predominately-axial grooves may be omitted entirely.

In one embodiment, the width of a groove is 1.524 mm. In other embodiments, the width of the groove may be greater than 1.524 mm. Likewise, the depth of a groove may vary between 0.10 mm and full tread depth.

As shown, the width of the first plurality of predominately-axial grooves 115 narrows near the axial-middle region of the rib. Thus, at least one of the predominately-axial grooves narrows across a portion of a circumferential rib. In an alternative embodiment, the first plurality of predominately-axial grooves may vary in width at any given axial point. In another alternative embodiment, the width of the first plurality of predominately-axial grooves is substantially constant.

The first plurality of predominately-axial grooves 115 follow a curvilinear path across ribs 110a and 110d. In an alternative embodiment, the first plurality of predominately-axial grooves may be substantially straight. As one of ordinary skill in the art will understand, the first plurality of predominately-axial grooves 115 may be disposed on a single rib—inner or outer—or on multiple ribs. In another embodiment (not shown), the predominately-axial grooves on at least two circumferential ribs align over at least one circumferential groove.

Ribs 110a and 110d also contain a second plurality of predominately-axial grooves 120. In alternative embodiments, the second plurality of predominately-axial grooves may be replaced with transverse grooves disposed at any angle. In another alternative embodiment, the second plurality of predominately-axial grooves may be omitted entirely.

In the illustrated embodiment the width of the second plurality of predominately-axial grooves 120 narrows to a sipe near the axial-inner region of the rib. In an alternative embodiment, the second plurality of predominately-axial grooves may vary in width at any given axial point. In another alternative embodiment, the width of the second plurality of predominately-axial grooves is substantially constant. As one of ordinary skill in the art will understand, the second plurality of predominately-axial grooves 120 may be disposed on a single rib—inner or outer—or on multiple ribs.

As shown, the second plurality of predominately-axial grooves 120 follows a curvilinear path across the ribs. In an alternative embodiment, the second plurality of predominately-axial grooves 120 is substantially straight.

Ribs 110a and 110d contain a first plurality of predominately-axial sipes 135. The sipes are predominately-axial because the axial displacement of the sipes is greater than the circumferential displacement of the sipes. In an alternative embodiment, the sipes may be oriented at any angle. In other alternative embodiments, the sipes may assume a variety of geometric patterns or orientations, including, without limitations, circular, curved, straight, diagonal, bent, zigzag, wavy forms. In general, the width of a sipe is 0.762 mm, but the width may vary between a smallest attainable manufacturing width and less than twice the size of a standard sipe (1.524 mm). Additionally, the depth of the sipe may vary from 0.10 mm to full tread depth.

As shown, the sipes begin at circumferential groove 105a and 105c and align with and widen into the second plurality of predominately-axial grooves 120. The width of the first plurality of predominately-axial sipes 135 is substantially constant before widening into the second plurality of predominately-axial grooves 120. The sipes follow a curvilinear path from the circumferential grooves and align with and widen into the second plurality of predominately-axial grooves 120. In alternative embodiments, the sipes follow a straight, angled, or bent path. In another alternative embodiment, the first plurality of predominately-axial sipes may vary in width at any given axial point. In yet another alternative embodiment, the first plurality of predominately-axial sipes 135 does not align with the second plurality of predominately-axial grooves 120.

As one of ordinary skill in the art will understand, the first plurality of predominately-axial sipes 135 may be disposed on a single rib—inner or outer—or on multiple ribs. In alternative embodiments, the predominately-axial sipes extend across the tread in a curved, curly, sinusoidal, diagonal, straight, bent, or zigzag manner. In alternative embodiments, the first plurality of predominately-axial sipes may be replaced with transverse grooves disposed at any angle. In another alternative embodiment, the first plurality of predominately-axial sipes may be omitted entirely.

Ribs 110b and 110c also contain a third plurality of predominately-axial grooves 125. As shown, the width of the third plurality of predominately-axial grooves 125 is substantially constant. The grooves follow a curvilinear path across ribs 110b and 110c. In an alternative embodiment, the third plurality of predominately-axial grooves may vary in width at any given axial point. As one of ordinary skill in the art will understand, the third plurality of predominately-axial grooves 125 may be disposed on a single rib—inner or outer—or on multiple ribs. In alternative embodiments, the third plurality of predominately-axial grooves may be replaced with transverse grooves disposed at any angle. In another alternative embodiment, the third plurality of predominately-axial grooves may be omitted entirely.

Ribs 110b and 110c contain a fourth plurality of predominately-axial grooves 130. As shown, the fourth plurality of predominately-axial grooves follow a curvilinear path across the ribs, and the width of the grooves 130 narrows to a sipe near the axial-inner region of the rib. In an alternative embodiment, the fourth plurality of predominately-axial grooves may vary in width at any given axial point. In another alternative embodiment, the width of the fourth plurality of predominately-axial grooves is substantially constant. As one of ordinary skill in the art will understand, the fourth plurality of predominately-axial grooves 130 may be disposed on a single rib—inner or outer—or on multiple ribs. In alternative embodiments, the fourth plurality of predominately-axial grooves may be replaced with transverse grooves disposed at any angle. In another alternative embodiment, the fourth plurality of predominately-axial grooves may be omitted entirely.

Ribs 110b and 110c contain a second plurality of predominately-axial sipes 140. As shown, the sipes begin at circumferential groove 105b and align with and widen into the fourth plurality of predominately-axial grooves 130. The width of the second plurality of predominately-axial sipes 140 is substantially constant before widening into the fourth plurality of predominately-axial grooves 130. The sipes follow a curvilinear path from circumferential groove 105b and align with and widen into the fourth plurality of predominately-axial grooves 130. In alternative embodiments, the sipes follow a straight, angled, or bent path. In another alternative embodiment, the second plurality of predominately-axial sipes may vary in width at any given axial point. In yet another alternative embodiment, the second plurality of predominately-axial sipes 140 does not align with the fourth plurality of predominately-axial grooves 120. As one of ordinary skill in the art will understand, the second plurality of predominately-axial sipes 140 may be disposed on a single rib—inner or outer—or on multiple ribs. In an alternative embodiment, the second plurality of predominately-axial sipes may vary in width at any given axial point. In another alternative embodiment, the second plurality of predominately-axial sipes 140 does not align with the fourth plurality of predominately-axial grooves 130. As one of ordinary skill in the art will understand, the second plurality of predominately-axial sipes 140 may be disposed on a single rib—inner or outer—or on multiple ribs. In alternative embodiments, the second plurality of predominately-axial sipes may be replaced with transverse grooves disposed at any angle. In another alternative embodiment, the second plurality of predominately-axial sipes may be omitted entirely.

Ribs 110a and 110d contain narrow wavy circumferential grooves 145. The width of the narrow wavy circumferential grooves is greater than the width of a sipe, but less than the width of circumferential grooves 105a-c. Apart from brief intersections with grooves or sipes, narrow wavy circumferential grooves 145 extend continuously around the tire in the circumferential direction. Thus, the narrow wavy circumferential grooves 145 extend substantially continuously around the tire in the circumferential direction. As shown, the two narrow wavy circumferential grooves 145 undulate axially between an outer edge of the tire tread and an outer edge of a circumferential groove, 105a and 105c, without touching the edge of the tread or the circumferential grooves. In alternative embodiments, the wavy circumferential grooves undulate sinusoidally, and they may touch the edge of the tread or the edge of a circumferential groove (for example, in a tangential manner). In another alternative embodiment, the frequency or the magnitude of the sinusoidal undulations varies.

In one embodiment, the depth of the wavy circumferential grooves 145 is equal to the depth of the first plurality of predominately-axial sipes 140 at the location where the wavy circumferential grooves 145 intersect the first plurality of predominately-axial sipes 140. In an additional embodiment, the depth of the wavy circumferential grooves 145 does not exceed 40% of the depth of the circumferential grooves 105a-d. In yet another embodiment, the depth of the wavy circumferential grooves 145 does not exceed 60% of the depth of the first plurality of predominately-axial grooves 115.

In additional alternative embodiments (not shown), ribs 110a and 110d also contain at least one narrow circumferential groove disposed near an outer edge of a rib, so as to form a so-called sacrificial rib. In a different embodiment, two or more wavy circumferential sipes or grooves are disposed on the inner halves of the outer circumferential ribs.

Ribs 110b and 110c contain narrow wavy circumferential sipes 150. The width of the narrow wavy circumferential sipes is greater than or equal to the width of a sipe, but less than the width of a narrow wavy circumferential groove 145. Apart from brief intersections with grooves or sipes, narrow wavy circumferential sipes 150 extend continuously around the tire in the circumferential direction. Thus, the narrow wavy circumferential sipes 150 extend substantially continuously around the tire in the circumferential direction. As shown, the narrow wavy circumferential sipes 150 undulate axially between an axially-inner edge of circumferential grooves 105a and 105c and circumferential groove 105b. The narrow wavy circumferential sipes 150 undulate axially between the circumferential grooves without touching the edge of the circumferential grooves. Thus, the narrow wavy circumferential sipes 150 undulate axially between the edges of adjacent circumferential grooves. In alternative embodiments, the wavy circumferential grooves undulate sinusoidally, and they may touch the edge of a circumferential groove (for example, in a tangential manner). In additional alternative embodiments, the frequency and/or the magnitude of the sinusoidal undulations varies. In another embodiment, the wavy circumferential sipe disposed on an inner circumferential rib is disposed on the middle third of the inner circumferential rib. In alternative embodiments, the narrow wavy circumferential sipes may be replaced with narrow circumferential sipes. In another alternative embodiment, the narrow wavy circumferential grooves may be omitted entirely.

Tire 100 also contains a plurality of tie-bars 165. Tie-bars 165 are disposed in the first plurality of predominately-axial grooves 115. As one of ordinary skill in the art will understand, tie bars may be disposed in other predominately-axial grooves. The tie bars increase the tread pattern's stiffness. In alternative embodiments, the first plurality of tie-bars may be omitted entirely.

Figure 3A:
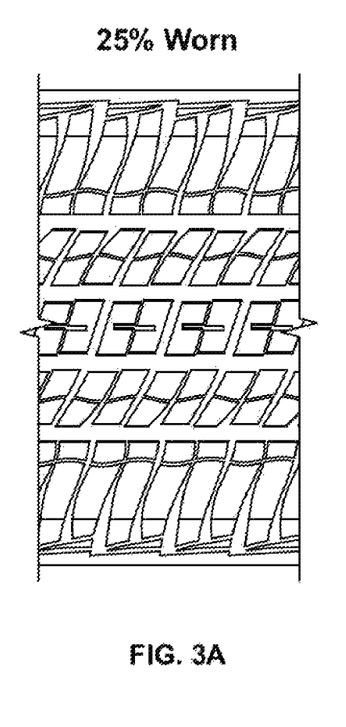
FIG. 3a is a top plan view of the tire shown in FIG. 1 when the tire tread is 25% worn.
Figure 3B:
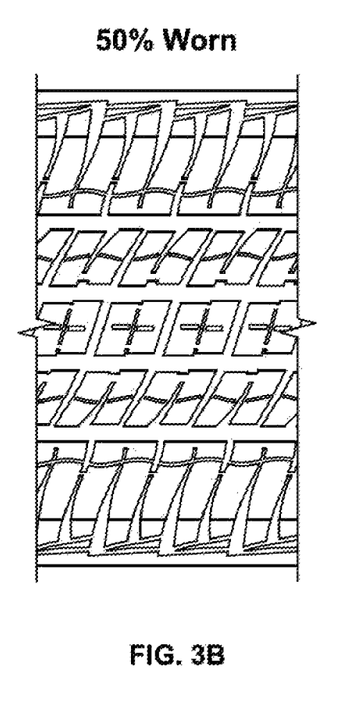
FIG. 3b is a top plan view of the tire shown in FIG. 1 when the tire tread is 50% worn.
Figure 3C:
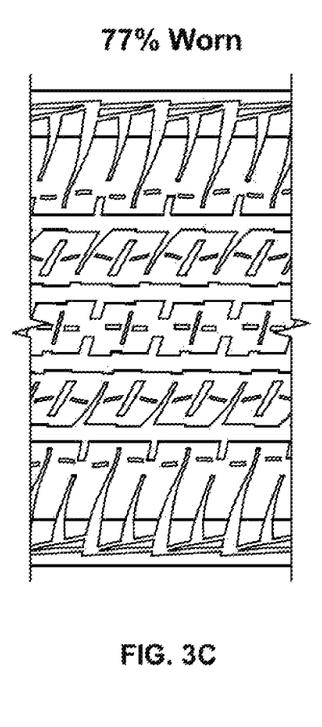
FIG. 3c is a top plan view of the tire shown in FIG. 1 when the tire tread is 75% worn.

FIGS. 3a-c are top plan views of the tire shown in FIG. 1 as the tire tread is increasingly worn. FIG. 3a shows the tire at 25% wear, FIG. 3b shows the tire at 50% wear, and FIG. 3C shows the tire at 75% wear.

As shown in FIG. 3b, the width of the narrow wavy circumferential grooves 145 at 50% wear is greater than the width of the narrow wavy circumferential grooves 145 when the tire is new. Likewise, the widths of the first plurality of predominately-axial grooves 115, second plurality of predominately-axial grooves 120, fourth plurality of predominately-axial grooves 130, first plurality of predominately-axial sipes 135, and second plurality of predominately-axial sipes 140 at 50% wear is greater than the width of these features when the tire is new. As one of ordinary skill in the art will understand, the widths of any of these features may be adjusted independently from any other adjustment to the tire.

Figure 4:
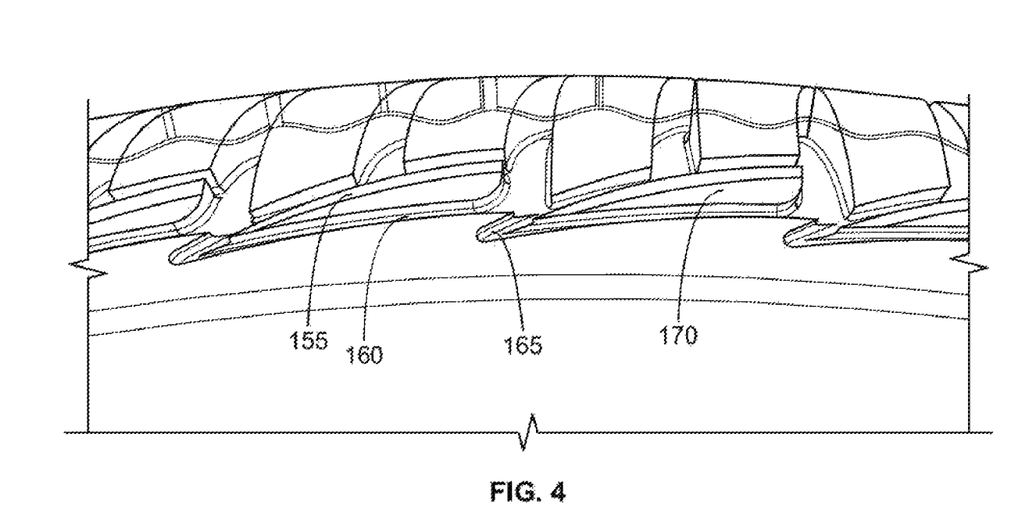
FIG. 4 is a side elevational cross-sectional view of the tire shown in FIG. 1.

FIG. 4 is a side elevational cross-sectional view of the tire shown in FIG. 1. As shown, the first plurality of shoulder grooves 155 and second plurality of shoulder grooves 160 connect at a common vertex, 165. The first and second pluralities of shoulder grooves are separated by a wedge 170.

Figure 5:
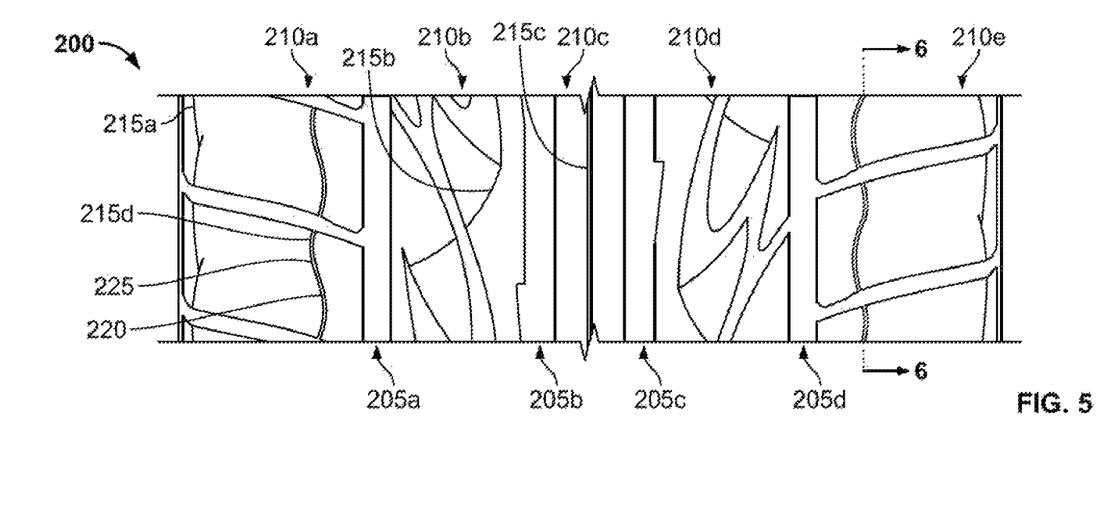
FIG. 5 is a top plan view of an alternative embodiment of a new tire.

FIG. 5 is a top plan view of an embodiment of a new tire 200. As one of ordinary skill in the art will understand, tire 200 is suitable for use in various types of vehicles, and is particularly suitable for high-performance passenger vehicle or light truck applications. As shown, tire 200 contains a plurality of main circumferential grooves 205a-d and a plurality of discrete road-contacting land portions 210a-e. As one of ordinary skill in the art will understand, the main grooves 205a-d can come in a variety of widths, may have different axial displacements, may curve, zigzag, or be straight, and may contain features such as chamfering, stone ejectors, or noise resonance reduction protrusions. Likewise, the discrete road-contacting land portions 210a-e can come in a variety of widths and geometries. The land portions may be continuous around the tire, or they may be divided by various grooves or sipes.

As shown, tire 200 contains tread sipes 215a-d. Tread sipes 215a extend circumferentially along a scalloped path, tread sipes 215b extend along a curved, diagonal path, and tread sipe 215c extends circumferentially down the center of the tread. In alternative embodiments (not shown), tread sipes 215a-c assume a curved, zigzag, or geometric geometry.

As shown, tread sipe 215d is a three-dimensional circumferentially-oriented serpentine sipe that extends predominately in the circumferential direction. Thus, tread sipe 215d is a narrow, wavy, circumferential groove. Line 6-6 represents the bottom of tread sipe 215d. Tread sipe 215d has a first axial position 220, which is associated with a minimum axial displacement (the shortest axial distance between a main groove and tread sipe 215d). Tread sipe 215d has a second axial position 225, which is associated with a maximum axial displacement (the longest axial distance between a main groove and tread sipe 215d). In one embodiment, the axial distance between the first and second axial positions of tread sipe 215d does not exceed 10% of the width of the tire tread. In another embodiment, the axial distance between the first and second axial positions of tread sipe 215d does not exceed 25% of the width of the tire tread.

In the illustrated embodiment, the tread sipe 215d is said to extend predominately in the circumferential direction because the circumferential displacement between the first and second axial positions, 220 and 225, exceeds the axial displacement between the two positions. As shown, the circumferentially-oriented serpentine tread sipe 215d follows a serpentine path between the first and second axial positions, 220 and 225. In another embodiment, the tread sipe extends predominately in the circumferential direction—in other words, the circumferential displacement between two inflection points typically exceeds the axial displacement between the same two inflection points. In such an embodiment, the circumferentially-oriented serpentine tread sipe also follows a serpentine path between the two inflection points.

Further, as shown, tread sipe 215d is disposed on a single discrete road-contacting land portion 210e. In an alternative embodiment, tread sipe 215d is disposed across multiple road-contacting land portions. In another embodiment, multiple three-dimensional circumferentially-oriented serpentine sipes are disposed on multiple road-contacting land portions.

Figure 6:
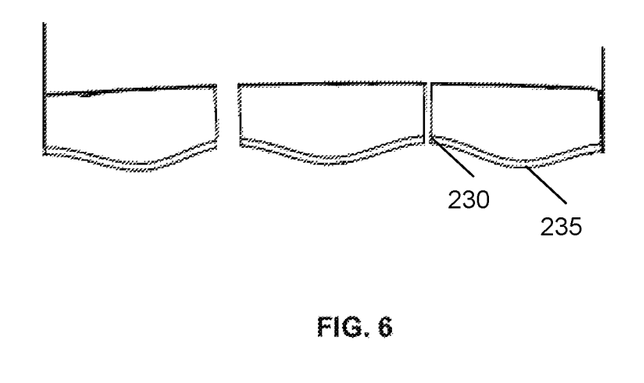
FIG. 6 is a side elevational cross-sectional view taken along line 6-6 in FIG. 5.

FIG. 6 is a side elevational cross-sectional view taken along line 6-6 in FIG. 5. FIG. 6 shows how the depth of tread sipe 215d varies over a given circumferential displacement. As shown, tread sipe 215d has a first depth 230 and a second depth 235. The first depth 230 is a minimum sipe depth, which represents the shortest (shallowest) radial distance between the tread surface and the bottom of tread sipe 215d. The second depth 235 is a maximum sipe depth, which represents the greatest (deepest) radial distance between the tread surface and the bottom of tread sipe 215d. The first and second depths may be selected at any location. As shown, tread sipe 215d follows a serpentine path between the first and second depths, 230 and 235. In one embodiment, the first depth 230 is generally under a tread sipe. In an alternative embodiment, the first depth 230 is in substantial proximity (in the radial direction) to a tread sipe because the distance between the first depth 230 and the tread sipe is between 5-15% of the tread width.

In the embodiment shown in FIG. 6, the first depth 230 of tread sipe 215d is at least 10% greater than the depth of a typical tread sipe, and the second depth 235 of tread sipe 215d is at least 10% less than the depth of a main groove 205a-d. In another embodiment (not shown), the first depth 230 is at least 20% greater than the depth of a typical tread sipe, and the second depth 235 is at least 20% less than the depth of a main groove 205a-d.

While only the depth of the first circumferentially oriented sipe 215d is shown and discussed, it should be understood that the other circumferentially oriented sipes in the other ribs may have the same variable depth.

Figure 7:
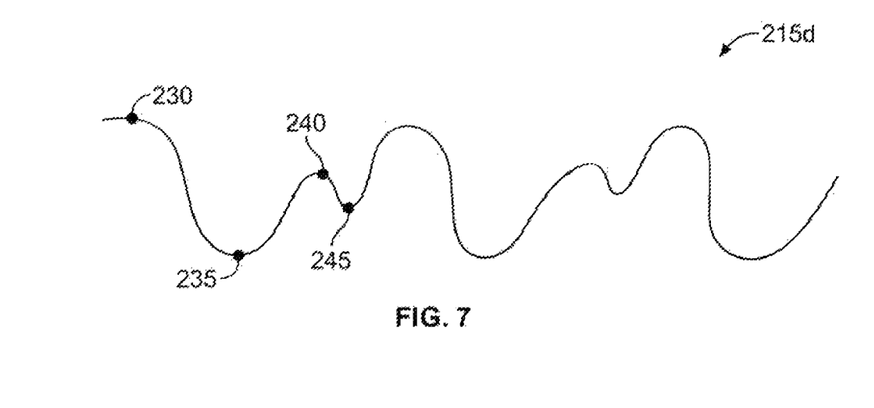
FIG. 7 is a side elevational cross-sectional view of an alternative embodiment of a new tire.

FIG. 7 is a side elevational cross-sectional view of an alternative embodiment of a new tire. In the embodiment shown in FIG. 7, tread sipe 215d has a first depth 230 and second depth 235 that are generally the same as the first and second depths shown in FIG. 6. In addition, as shown in FIG. 7, this alternative embodiment of tread sipe 215d has a third depth 240 and fourth depth 245. Third depth 240 is greater (deeper) than the first depth 230 but less (shallower) than the second depth 235. Fourth depth 245 is greater (deeper) than the third depth 240 but less (shallower) than the second depth 235. The circumferentially-oriented serpentine tread sipe 215d follows a serpentine path in the radial plane between the first, second, third, and fourth depths, 230, 235, 240, and 245.

Figure 8:
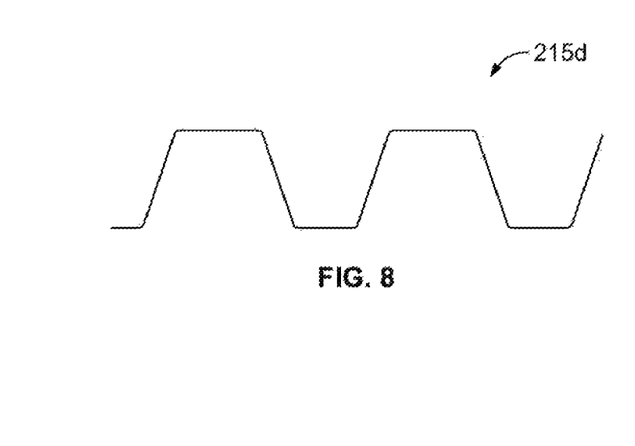
FIG. 8 is a side elevational cross-sectional view of another alternative embodiment of a new tire.

FIG. 8 is a side elevational cross-sectional view of another alternative embodiment of a new tire. In the embodiment shown in FIG. 8, tread sipe 215d has a first depth 230 and second depth 235 that are generally the same as the first and second depths shown in FIG. 6. In addition, as shown in FIG. 8, this alternative embodiment of tread sipe 215d follows a diagonal path when viewed in the radial plane. As shown, the diagonal path corresponds to three sides of a trapezoid because it contains two angled portions of varying depth and one straight portion of constant depth. In another embodiment (not shown), the diagonal path contains multiple slopes and multiple lengths. In a different embodiment (also not shown), the diagonal path connects to third and fourth depths.

Figure 9:
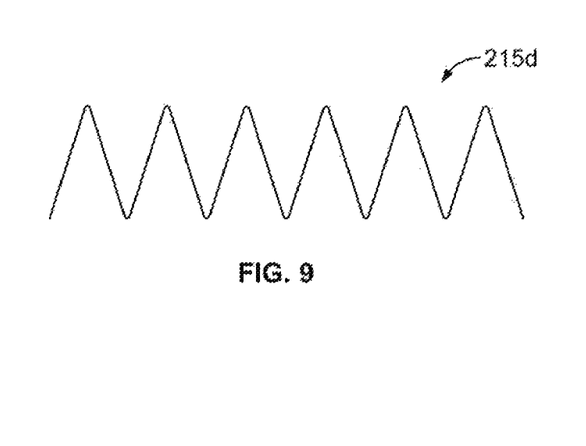
FIG. 9 is a side elevational cross-sectional view of yet another alternative embodiment of a new tire.

FIG. 9 is a side elevational cross-sectional view of yet another alternative embodiment of a new tire. In the embodiment shown in FIG. 9, tread sipe 215d has a first depth 230 and second depth 235 that are generally the same as the first and second depths shown in FIG. 6. In addition, as shown in FIG. 9, this alternative embodiment of tread sipe 215d follows a diagonal or saw-toothed path when viewed in the radial plane. As shown, the diagonal path contains no rounded edges, but a person of ordinary skill in the art would understand that the edges may be slightly rounded. In another embodiment (not shown), the diagonal path contains multiple slopes and multiple lengths. In a different embodiment (also not shown), the diagonal path connects to third and fourth depths.

Figure 10:
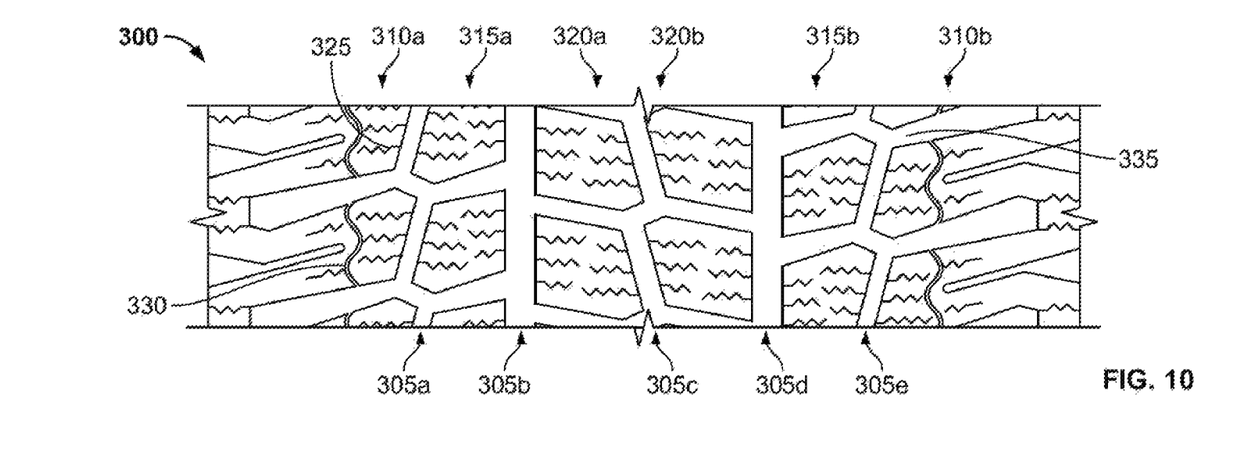
FIG. 10 is a top plan view of still another alternative embodiment of a new tire tread.

FIG. 10 is a top plan view of another embodiment of a new tire tread 300. In one application, the tread shown in FIG. 10 is for use on a pneumatic tire comprising a first annular bead and a second annular bead, a body ply extending between the first annular bead and the second annular bead, a circumferential belt disposed radially outward of the body ply and extending axially across a portion of the body ply, a circumferential tread disposed radially outward of the circumferential belt and extending axially across a portion of the body ply, a first reinforcement ply disposed radially between the circumferential tread and the circumferential belt and extending axially across a portion of the body ply, a first sidewall extending between the first annular bead and a first shoulder, the first shoulder being associated with the circumferential tread, and a second sidewall extending between the second annular bead and a second shoulder, the second shoulder being associated with the circumferential tread. In another application (not shown), the tread may be used on a non-pneumatic tire or wheel, which may not have certain components present in a pneumatic tire. In yet another application (also not shown), the tread is a retread.

As shown in FIG. 10, the circumferential tread 300 contains five circumferential grooves 305a-e. The circumferential grooves 305a-e divide the circumferential tread into two outer circumferential ribs and a middle rib. The outer circumferential ribs have two rows of tread blocks, 310a, 310b, 315a and 315b. The middle rib has two rows of tread blocks 320a and 320b. In alternative embodiments (not shown), the tread has four, five, or six circumferential grooves and five, six, or seven ribs.

As shown in FIG. 10, the circumferential tread 300 also contains a first plurality of rib sipes 325. The rib sipes 325 are disposed on every row of tread blocks on all three ribs. In alternative embodiments (not shown), the rib sipes are not disposed on every row of tread blocks or every rib. In an additional embodiment (also not shown), the tread features several pluralities of rib sipes.

As shown in FIG. 10, the circumferential tread 300 also contains a plurality of curvilinear spline sipes 330. One curvilinear spline sipe is disposed on an outer row of tread blocks 310a, and at least one other curvilinear spline sipe is disposed on a different circumferential rib (e.g., 310b). In a specific embodiment (shown in FIG. 10), the tread only has two curvilinear spline sipes, both of which are disposed on the outer circumferential ribs.

The curvilinear spline sipes 330 intersect the rib sipes 325. It is understood that the curvilinear spline sipes 330 are substantially continuous even though they may intersect various features such as rib sipes 325 or rib grooves 335. As shown, the curvilinear spline sipe 330 disposed on the outer circumferential rib follows a substantially-continuous sinusoidal circumferential path around the tire when the tire is new.

In one embodiment, the curvilinear spline sipe 330 becomes discontinuous as the tire wears. In one version of this particular embodiment, the curvilinear spline sipe disposed on the outer circumferential rib follows a non-continuous circumferential path when the circumferential tread depth is reduced by 75%. In another embodiment (not shown), the depth of the plurality of curvilinear spline sipes is configured so that the circumferential tread void decreases between 2 and 10% when the circumferential tread depth is reduced by 50%. In a different embodiment (also not shown), the depth of the plurality of curvilinear spline sipes is configured so that the circumferential tread void decreases between 5 and 12% when the circumferential tread depth is reduced by 75%.

In one embodiment (shown in FIG. 13), the curvilinear spline sipes 330 have multiple axial inflection points 340 when viewed in the circumferential plane. Additionally, the curvilinear spline sipes 330 have multiple radial inflection points when viewed in the radial plane (not shown in FIG. 10).

Each curvilinear spline sipe 330 has a depth that varies based on its proximity to a sipe. The localized depth of the curvilinear spline sipe 330 is the depth of the sipe at any given point on the tread. The depth of the spline sipe varies in proportion to the distance from the rib sipes that intersect the at least one curvilinear spline sipe. Thus, the depth of the curvilinear spline sipe 330 will increase as the distance from a rib sipe increases. In one embodiment, the depth of a curvilinear spline sipe 330 increases in direct proportion to the distance from a rib sipe. In another embodiment, the depth of a curvilinear spline sipe 330 increases as a mathematical function of the distance from a rib sipe.

In the embodiment shown in FIG. 10, the circumferential tread 300 is well suited for use as a snow tire in passenger and light truck applications. The circumferential tread, however, has uses beyond passenger and light truck applications. One such exemplary use includes, without limitation, truck-and-bus-radial tire applications.

In a different embodiment (not shown), the circumferential tread further comprises a narrow curvilinear spline groove. The narrow curvilinear spline groove follows a sinusoidal circumferential path around the tire. One of ordinary skill in the art would understand that a narrow curvilinear spline groove is wider than a sipe but narrower than a circumferential groove.

Figure 11:
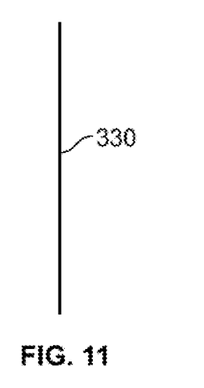
FIG. 11 is a top plan view of an alternative embodiment of a new tire.

FIG. 11 is a top plan view of an alternative embodiment of a new tire. In the embodiment shown in FIG. 11, curvilinear spline sipe 330 follows a straight path in the circumferential plane.

Figure 12:
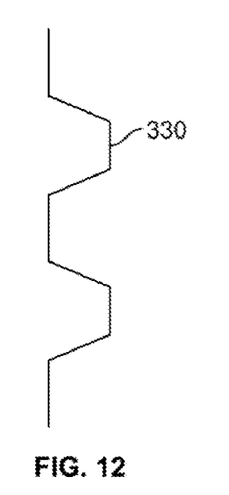
FIG. 12 is a top plan view of an alternative embodiment of a new tire.

FIG. 12 is a top plan view of an alternative embodiment of a new tire. In the embodiment shown in FIG. 12, curvilinear spline sipe 330 follows a circumferential path that contains alternating straight and curved segments.

Figure 13:
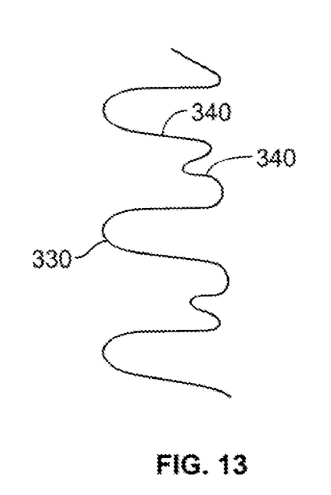
FIG. 13 is a top plan view of an alternative embodiment of a new tire.

FIG. 13 is a top plan view of another alternative embodiment of a new tire. In the embodiment shown in FIG. 13, curvilinear spline sipe 330 follows a curved circumferential path that contains multiple axial inflection points.

Figure 14:
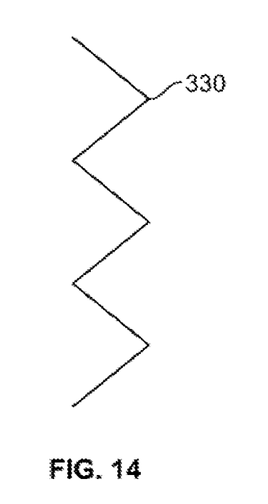
FIG. 14 is a top plan view of an alternative embodiment of a new tire.

FIG. 14 is a top plan view of yet another alternative embodiment of a new tire. In the embodiment shown in FIG. 14, curvilinear spline sipe 330 follows a zigzag path in the circumferential plane.

As one of ordinary skill in the art would understand, the tire embodiments described in this disclosure may be configured for use on a vehicle selected from the group consisting of motorcycles, golf carts, scooters, military vehicles, passenger vehicles, hybrid vehicles, high-performance vehicles, sport-utility vehicles, light trucks, heavy trucks, heavy-duty vehicles, and buses. One of ordinary skill in the art would also understand that the embodiments described in this disclosure may be utilized with a variety of tread patterns, including, without limitation, symmetrical, asymmetrical, directional, studded, and stud-free tread patterns. One of ordinary skill in the art would also understand that the embodiments described in this disclosure may be utilized, without limitation, in high-performance, winter, all-season, touring, non-pneumatic, and retread tire applications.

To the extent that the term "includes" or "including" is used in the specification or the claims, it is intended to be inclusive in a manner similar to the term "comprising" as that term is interpreted when employed as a transitional word in a claim. Furthermore, to the extent that the term "or" is employed (e.g., A or B) it is intended to mean "A or B or both." When the applicants intend to indicate "only A or B but not both" then the term "only A or B but not both" will be employed. Thus, use of the term "or" herein is the inclusive, and not the exclusive use. See, Bryan A. Garner, A Dictionary of Modern Legal Usage 624 (2d. Ed. 1995). Also, to the extent that the terms "in" or "into" are used in the specification or the claims, it is intended to additionally mean "on" or "onto." Furthermore, to the extent the term "connect" is used in the specification or claims, it is intended to mean not only "directly connected to," but also "indirectly connected to" such as connected through another component or components.

While the present disclosure has been illustrated by the description of embodiments thereof, and while the embodiments have been described in considerable detail, it is not the intention of the applicants to restrict or in any way limit the scope of the appended claims to such detail. Additional advantages and modifications will readily appear to those skilled in the art. Therefore, the disclosure, in its broader aspects, is not limited to the specific details, the representative apparatus and method, and illustrative examples shown and described. Accordingly, departures may be made from such details without departing from the spirit or scope of the applicant's general inventive concept.

What is claimed is:

1. A tire comprising:
    a first annular bead and a second annular bead
    a body ply extending between the first annular bead and the second annular bead;
    a circumferential belt disposed radially outward of the body ply and extending axially across a portion of the body ply;
    a circumferential tread disposed radially outward of the circumferential belt and extending axially across a portion of the body ply;
    a first sidewall extending between the first annular bead and a first shoulder, the first shoulder being associated with the circumferential tread; and
    a second sidewall extending between the second annular bead and a second shoulder, the second shoulder being associated with the circumferential tread,
        wherein the circumferential tread further comprises at least three circumferential grooves that divide the circumferential tread into two outer circumferential ribs and two inner circumferential ribs, and a narrow, wavy, circumferential groove,
        wherein the narrow, wavy, circumferential groove has multiple inflection points, wherein the narrow, wavy, circumferential groove is disposed on an outer circumferential rib, wherein the narrow, wavy, circumferential groove follows a substantially-continuous sinusoidal circumferential path around the tire when the tire is new, and wherein the narrow, wavy, circumferential groove follows a non-continuous circumferential path when the circumferential tread depth is reduced by 75%.

2. The tire of claim 1, wherein the narrow, wavy, circumferential groove has a first depth a second depth, a third depth, and a fourth depth, wherein the first depth is a minimum depth, wherein the second depth is a maximum depth, wherein the third depth is greater than the first depth but less than the second depth, and wherein the fourth depth is greater than the third depth but less than the second depth.

3. The tire of claim 1, wherein a width of the narrow, wavy, circumferential groove when the circumferential tread depth is reduced by 50% is greater than the width of the narrow, wavy, circumferential groove when the tire is new.

4. The tire of claim 1, wherein the circumferential tread further includes a plurality of predominately-axial grooves.

5. The tire of claim 4, wherein a width of each of the plurality of predominately-axial grooves when the circumferential tread depth is reduced by 50% is greater than the width of each of the plurality of predominately-axial grooves when the tire is new.

6. The tire of claim 4, further comprising a plurality of tie-bars disposed in the plurality of predominately-axial grooves.

\* \* \* \* \*